United States Patent [19]

Kallin et al.

[11] Patent Number: 5,115,325

[45] Date of Patent: May 19, 1992

[54] OPTICAL READER HEAD WITH VIDEO COMPENSATION METHOD AND CIRCUIT WHICH INTEGRATES FOUR ADJACENT PIXELS INTO A COMPOSITE PIXEL

[75] Inventors: Fredrik L. N. Kallin; Raymond L. Higgins, both of Kitchener, Canada

[73] Assignee: NCR Corporation, Dayton, Ohio

[21] Appl. No.: 493,594

[22] Filed: Mar. 15, 1990

Related U.S. Application Data

[62] Division of Ser. No. 137,836, Dec. 24, 1987, Pat. No. 4,916,552.

[51] Int. Cl.⁵ ............................................. H04M 1/10
[52] U.S. Cl. .................................. 358/406; 358/471; 358/496; 358/446; 358/461
[58] Field of Search ............... 358/494, 498, 466, 471, 358/482, 483, 496, 406, 446, 461

[56] References Cited

U.S. PATENT DOCUMENTS

| | | | |
|---|---|---|---|
| 4,558,373 | 12/1985 | Plasencia et al. | 358/498 |
| 4,710,822 | 12/1987 | Matsunawa | 358/466 |
| 4,793,812 | 12/1988 | Sussman et al. | 358/483 |

*Primary Examiner*—Edward L. Coles, Sr.
*Attorney, Agent, or Firm*—Elmer Wargo

[57] ABSTRACT

An optical reader head with a video compensation circuit for use in high speed document reading. The reader head utilizes small focussed bulbs to illuminate the scanning line, with the head being comprised of first and second body sections housing a lens which focusses the light reflected from a document at the scanning line to a light array comprised of 256 sensors. Light from four adjacent sensors along the scanning line is integrated to produce a composite pixel which becomes one of 64 such composite pixels for a scanning line of data permitting the use of low wattage bulbs and also eliminating the possibility of burning a jammed document. A peak comparison EPROM is used for adjusting document background levels, for example, for use in thresholding the pixel data. The peak comparison PROM is used as a 14 bit address table with six bits being used for the gray level signal of the incoming composite signal, with three bits being used for a "Mode Value", and with five bits being used for a "Peak Gray Scale Value " from a prior scan. A special test circuit is used to insure accurate focussing of the lens.

8 Claims, 5 Drawing Sheets

OPTICAL READER HEAD WITH VIDEO COMPENSATION METHOD AND CIRCUIT WHICH INTEGRATES FOUR ADJACENT PIXELS INTO A COMPOSITE PIXEL

This is a continuation of application Ser. No. 137,836, filed Dec. 24, 1987, now U.S. Pat. No. 4,916,552.

BACKGROUND OF THE INVENTION

This invention relates, generally, to an optical reader head and a method and circuit for providing video compensation, and in particular, it relates to such a reader head, method, and circuit which are useful in a high speed document reading application.

One of the problems associated with a typical prior art optical reader is that it requires a high intensity of light to illuminate a document positioned at a scanning line associated with the reader. Generally, the high intensity light is located away from the scanning line, and it is delivered to the scanning line by a plurality of light pipes. If the high intensity lamp were positioned next to the document at the scanning line, there is a remote possibility that the high heat from the lamp might damage or burn the document whenever a document jam occurred at the scanning line.

Another problem associated with a typical prior art reader is that it is difficult to keep the optics in the reader in alignment. When adjustments are necessary, it is difficult and time consuming to make the adjustments.

SUMMARY OF THE INVENTION

In contrast with some of the problems mentioned with regard to prior art optical readers, the optical reader, method, and circuit for video compensation circuit according to this invention, provide the following advantages:

1. The means for adjusting the lens in the reader is cam driven, eliminating the need for external focussing threads which are easily damaged;
2. The lens within the reader can be removed for cleaning without changing the focus adjustment;
3. Very small size is achieved through the use of a miniaturized lighting system which includes small focussed bulbs which take very little power and generate little heat;
4. Redundancy is built into the lighting system in that one of the focussed bulbs may fail without affecting the performance of the reader; and
5. The video compensation circuit learns the background video level of each pixel at the scanning line at the start of reading each document, and consequently, this eliminates the need for video flatness and adjustments of the associated lighting system to obtain even illumination.
6. The video compensation circuit also compensates for lamp aging and dust accumulation.

In one aspect, a preferred embodiment of this invention relates to an optical reader head comprising: a body having first and second tubular portions, and securing means for detachably securing said first and second tubular portions in axial alignment, with one end of said first tubular portion forming a rear end of said body and with one end of said second member forming a front end of said body; a lens, and mounting means for adjustably fixing said lens within said first tubular portion; an array of light sensors positioned in said first tubular portion at said rear end of said body; a first line and a second line of light bulbs; a mounting member for mounting said first and second lines of light bulbs in spaced, parallel relationship thereon to enable the light from said light bulbs to be directed at a scanning line and reflected therefrom through said lens to said array of light sensors, said mounting member being secured to said second tubular portion at said front end of said body; and a resilient member adjustably secured to said second tubular portion to maintain a document at said scanning line at a predetermined distance from said lens.

In another aspect, a preferred embodiment of this invention relates to the combination comprising: a scanning plane having a scanning line thereat; transport means for moving documents to be scanned to said scanning line; a reader head positioned at said scanning plane to direct light at said scanning line; said reader head comprising: a body having a front end and a rear end; a first line and a second line of light bulbs; a mounting member mounted on said front end of said body for mounting said first and second lines of light bulbs in spaced parallel relationship thereon to enable the light from the light bulbs to be directed at a document positioned at said scanning line and to be reflected from said document between said first and second lines of light bulbs towards the rear end of said body; an array of a predetermined number of light sensors positioned at said rear end of said body, with each said sensor producing a pixel of data corresponding to an area of the document at said scanning line; a lens and mounting means for adjustably fixing said lens in said housing to direct light reflected from a said document at said array of light sensors; a resilient member adjustably secured to said body to maintain a document at said scanning line a predetermined distance from said lens; and a circuit for integrating the outputs of groups of adjacent said light sensors to produce a series of combined pixels therefrom whereby the sensitivity of said array of light sensors is effectively increased to enable said light bulbs to be of a low wattage to avoid heat damage to a document which may become jammed at said scanning line.

In yet another aspect, in an imaging system in which a plurality of sensors receive data pixels about a document at a scanning line, with each sensor producing an analog value for the associated data pixel at the scanning line, the method of compensating for variations in background levels on said document so as to enhance thresholding of said data pixels according to the method of this invention includes the steps: (a) converting each data pixel into a digital peak gray scale value; (b) storing the digital peak gray scale values for a scanning line of said data pixels in a RAM (c) comparing a digital peak gray scale value from a current scanning line with a correspondingly-situated digital peak gray scale value withdrawn from said RAM in a thresholding operation to produce a thresholded output for the associated data pixel; (d) also comparing the digital peak gray scale value from a current scanning line with the correspondingly-situated digital peak gray scale value withdrawn from said RAM to detect differences therebetween; ,e) adjusting the digital peak gray scale value withdrawn from said RAM in step d, if necessary, according to predetermined criteria based upon the differences of step d; (g) storing the digital peak gray scale value after adjustment, if any, from step e in said RAM whereby the digital peak gray scale values from step e are used for said comparing steps c and d for the digital peak gray scale values associated with the next scanning line.

The previously named advantages and others will become more readily understood in connection with the following specification, claims, and drawing.

DETAILED DESCRIPTION OF THE INVENTION

Figure 1:
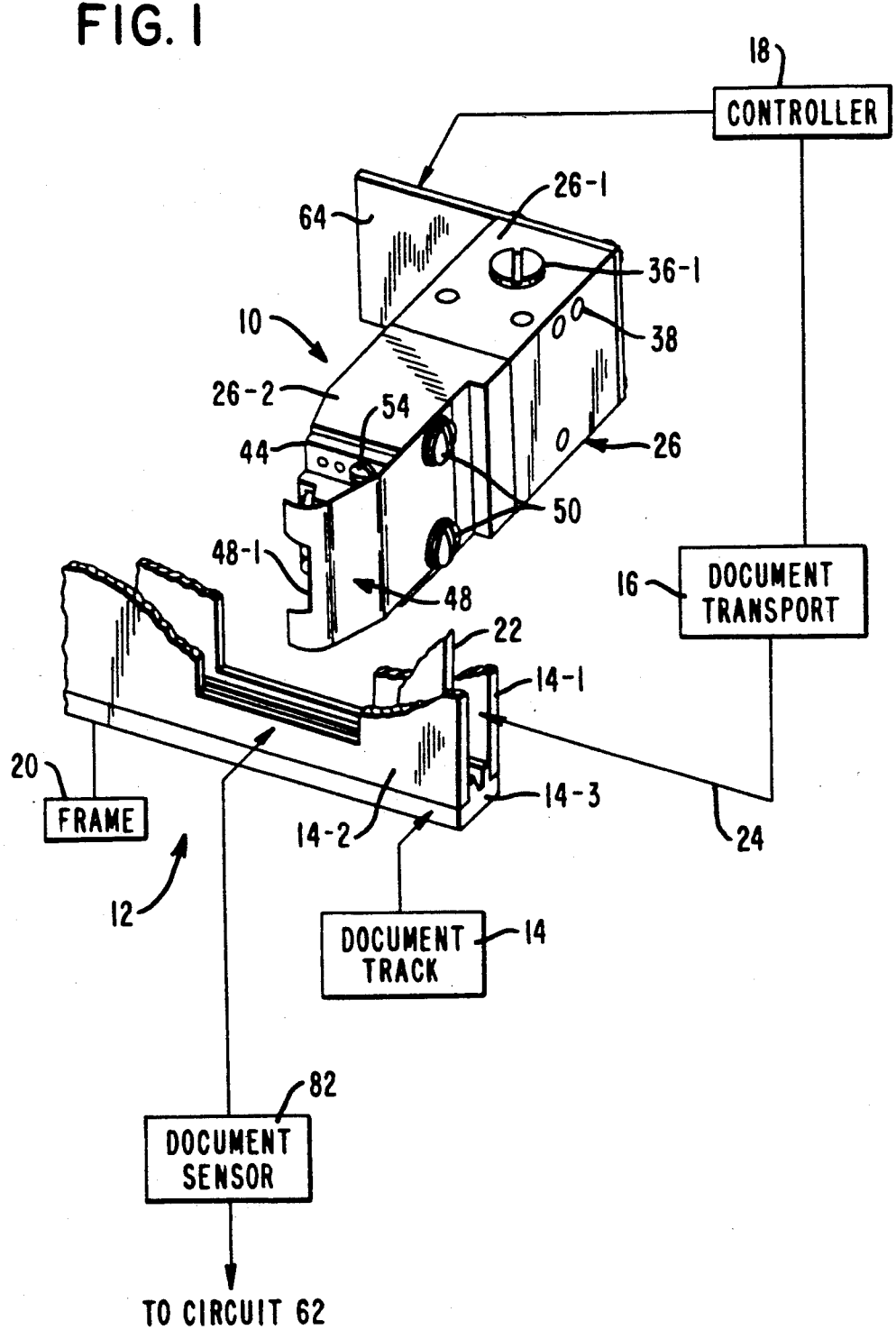
FIG. 1 is a general, perspective view of the reader head made according to this invention, showing its relationship to a document being scanned, with certain portions of the apparatus in which the reader head is utilized being shown in diagrammatic form.

FIG. 1 is a general, perspective view of the reader head made according to this invention and designated, generally, as 10. The reader head 10 is part of a reading apparatus 12 which includes a document track 14, a document transport 16, and a controller 18. The document track 14 has the vertically-upstanding side walls 14-1 and 14-2 which are secured to a bottom portion 14-3 which is secured to the frame 20 of the apparatus 12.

A document 22, to be read by the reader head 10, is moved in the document track 14 along the direction of arrow 24 by the conventional document transport 16. The reader head 10 is positioned relative to the document 22 so that it is in reading relationship with the data to be read on the document 22. In this regard, the back of the document is shown in FIG. 1, with the front of the document 22, having the data to be read thereon, facing the reader head 10.

Figure 2:
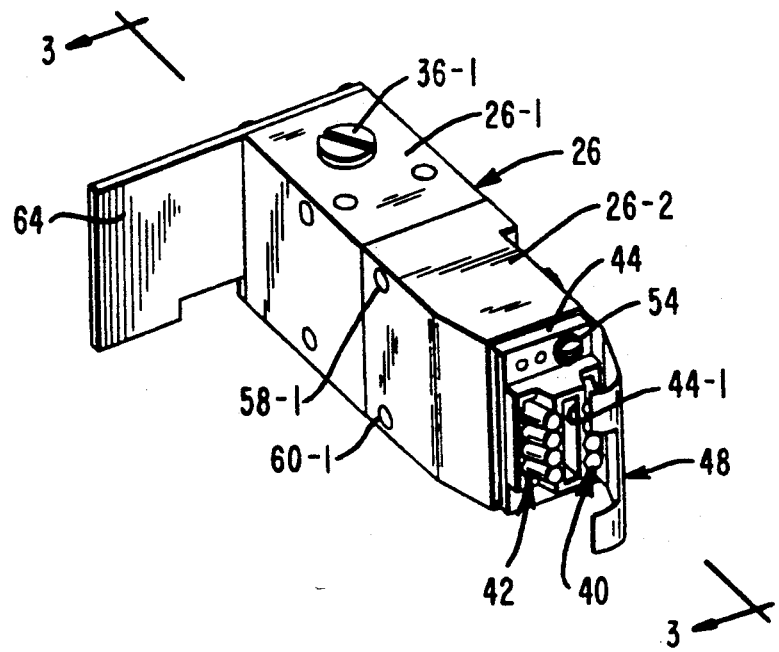
FIG. 2 is a general perspective view of the reader head shown in FIG. 1.
Figure 3:
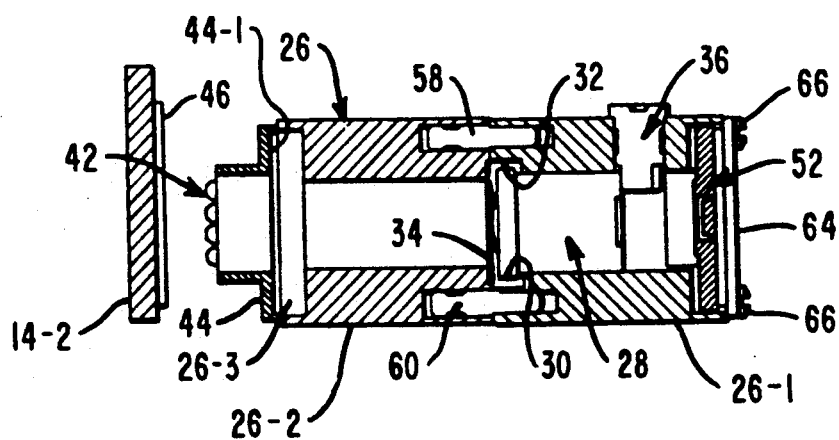
FIG. 3 is a cross sectional view, taken along the line 3—3 of FIG., to show additional details of the reader head shown in FIG. 2.

The details of the reader head 10 are shown in FIGS. 1-3. The reader head 10 includes a body 26 made up of first and second tubular portions 26-1 and 26-2, respectively, which are placed in axial alignment as shown best in FIG. 3. The first and second tubular portions 26-1 and 26-2 have a cylindrically shaped hole therein to receive a lens 28 which is mounted in the hole for axial movement therein. The lens 28 has an annular shoulder 30 which projects into an accommodating annular recess 32 in the first tubular portion 26-1. The second tubular portion 26-2 has an annular recess therein in the inner end thereof to receive the resilient member or spring 34 which biases the lens 28 against a camming member 36. The camming member 36 has a slotted head 36-1, which is rotated by a screw driver, to adjust the focussing of the lens 28. When adjusted, the camming member 36 is locked in position by a locking screw 38 shown in FIG. 1.

As stated earlier herein, the reader head 10 includes a first line 40 of light bulbs and a second line 42 of light bulbs which are mounted on a mounting member 44 in spaced parallel relationship, as shown in FIG. 2. The bulbs used in the first and second lines 40 and 42, respectively, are focussed bulbs which are of a low wattage. A typical bulb which may be used is bulb #4115-1, which is manufactured by Gilway, for example. In the embodiment described, there are four such bulbs in each of the first and second lines 40 and 42. The bulbs in the first and second lines 40 and 42 are mounted in member 44 to be focussed at a vertical scanning line 46 which is shown in exaggerated thickness on the upstanding wall or side 14-2 (FIG. 3) cf the document track 14. The first side 14-1 of the document track 14 has a portion removed therefrom to enable a resilient member 48 to pass therethrough and to contact a document 22 being read and keep it at a fixed focal distance relative to lens 28. The resilient member 48 is adjustably positioned on the second portion 26-1 of the body 26 by fasteners 50 (FIG. 1). The resilient member 48 has a notched-out portion in the area 48-1 to enable light from the first and second lines 40 and 42 to be directed at the scanning line 46 to illuminate a document positioned thereat. Data about the document then passes through the lens 28, and impinges upon a line scanner or light sensing array 52 located at the rear end of the body 26.

The mounting member 44 is made of a polyethersulfone material to withstand the somewhat high temperatures of the first and second lines 40 and 42 of light bulbs, with the temperatures being about 150 degrees C. The high intensity bulbs used in the prior art arrangements discussed earlier herein produce temperatures of about 350 degrees C. As stated earlier herein, there is a remote possibility that these high temperatures could burn or at least damage a document 22 which became jammed at the scanning line 46. With the low wattage bulbs used in the reader head 10, there is no risk of a document burning at the scanning line 46. Another feature of the bulbs used in the reader head 10 is that they have a life of about 40,000 hours compared to a life of about 1,000 hours for the high intensity bulbs mentioned in prior art arrangements. Another feature of the mounting member 44 is that it can support printed circuits 44-1 (for energizing the bulbs, for example) in addition to supporting the bulbs mentioned. The mounting member 44, with the first and second lines 40 and 42 of bulbs thereon, is secured to the front side of the second tubular portion 26-2 by fasteners 54 (FIG. 2). The second tubular member 26-2 has a cavity 26-3 therein to provide a clearance for contacts (not shown) associated with the mounting member 44 which also functions as a printed circuit board. The light sensing array 52 has its sensors 56 (FIG. 4) aligned with the scanning line 46. The characters on the document 22 to be read are moved in the direction of arrow 24 which is perpendicular to the scanning line 46.

The reader head 10 is designed to be disassembled for cleaning without having to make adjustments to the lens 28 after reassembly. In this regard, the first portion 26-1 of the body 26 has pins 58 and 60 secured therein, with these pins extending into aligned holes in the second portion 26-2 of the body 26. Screws 58-1 and 60-1 located in the second body portion 26-2 abut against the pins 58 and 60, respectively, to secure the second portion 26-2 to the first portion 26-1. To disassemble the reader head 10, the screws 58-1 and 60-1 (FIG. 2) are loosened, permitting the second body portion 26-2 to be removed from the first body portion 26-1 and permitting the lens 28 to be removed for cleaning. The light sensing array 52 can also be cleaned at this time. After cleaning, the lens 28 i; inserted in the first body portion 26-1, and the second body portion 26-2 is pushed on the pins 58 and 60, and the fasteners 58-1 and 60-1 are tightened to secure the body 26. Notice that because the cam member 36 was not touched, the spring member 34 pushes the lens 28 against the cam member 36 to position the lens in its adjusted position.

Figure 4A:
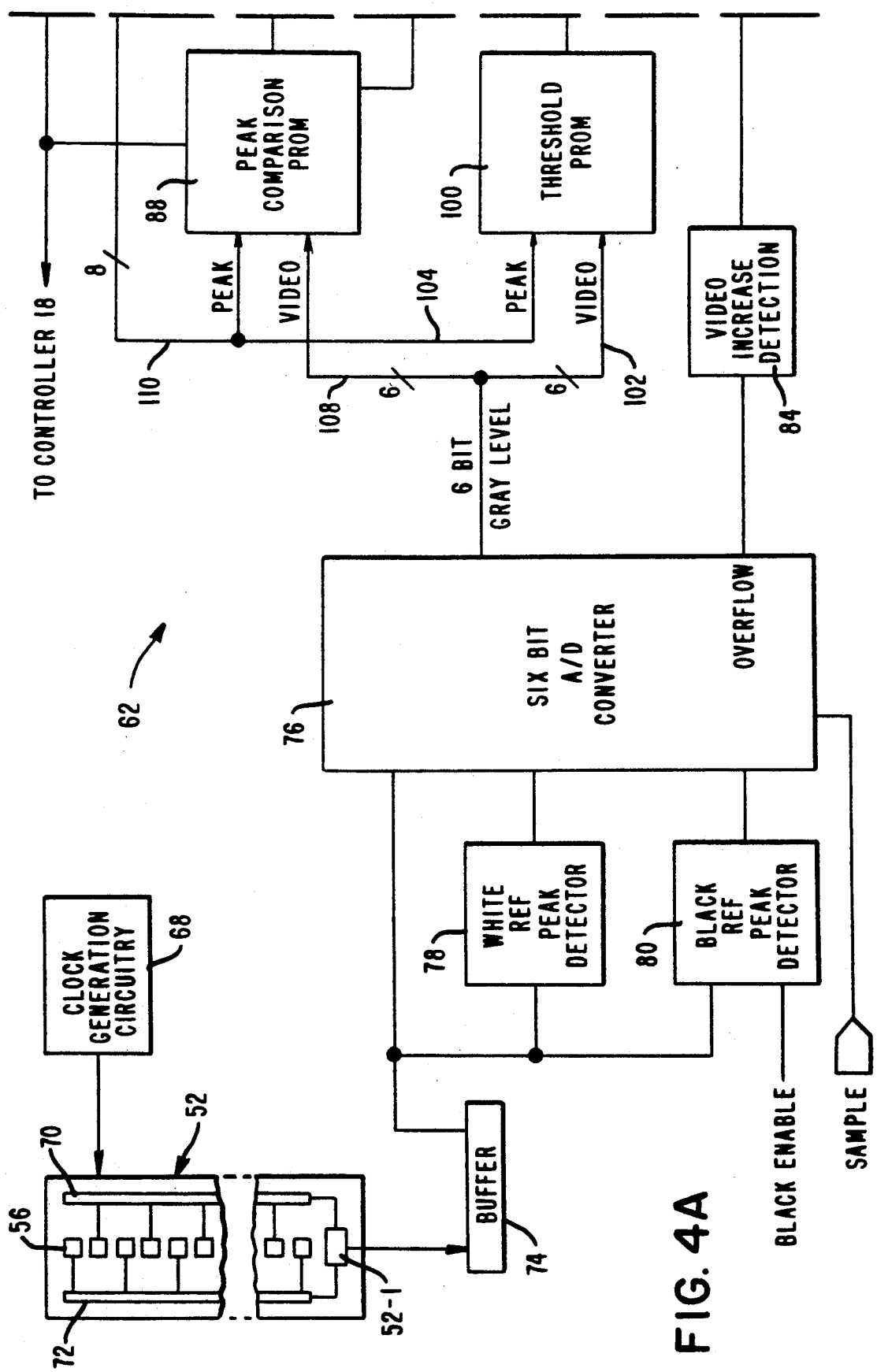
FIGS. 4A and 4B taken together show a schematic diagram of the video compensation circuit made according to this invention.
Figure 4B:
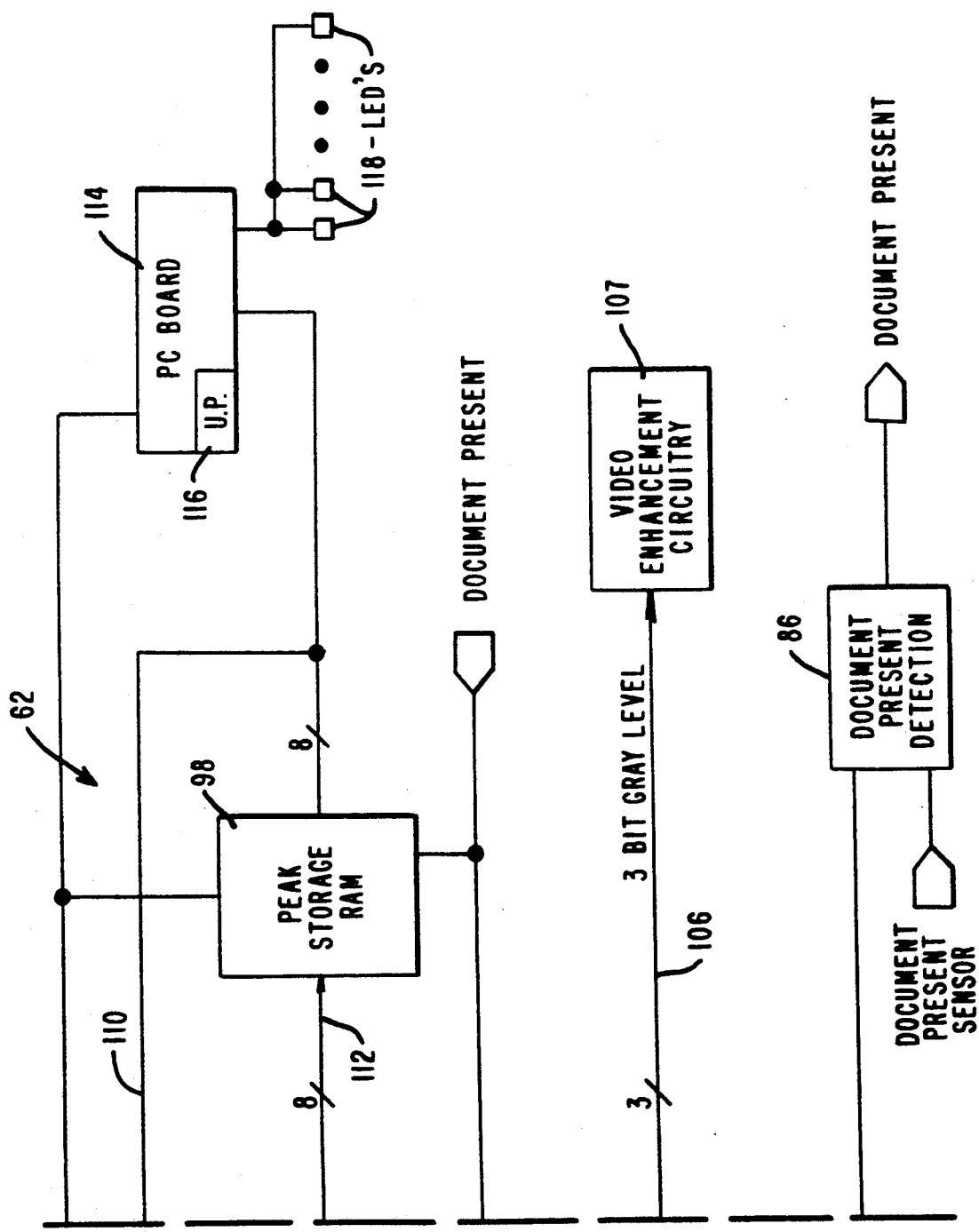

The video compensation circuit, hereinafter referred to as circuit 62, is shown in FIGS. 4A and 4B. Portions (to be later described herein) of the circuit 62 are mounted on a printed circuit board 64. The board 64 is secured to the rear end of the body 26 by fasteners 66 as shown in FIG. 3. The light sensing array 52 provides the video input to the circuit 62 as seen in FIG. 4. In the embodiment described, the light sensing array 52 is a charge coupled device (CCD) which has 256 individual sensors aligned along the scanning line 46. A typical CCD device which may be used for the light sensing array 52 is device CCD111A, for example, which is manufactured by Fairchild, for example. One of the features of this invention is that by changing the timing to the light sensing array 52, it is possible to integrate the charge on four adjacent sensors 56 along the scanning line 46 and combine them into a composite charge. Instead of having 256 individual outputs, there are 64 combined outputs or composite pixels along the scanning line 46, representing the pixel data associated with a document for a single scan at a scanning line 46. By combining the charges together in groups of four as described, the light sensing array 52 functions as though its sensitivity is increased, requiring a much lower level of light intensity when compared to the prior art devices mentioned earlier herein. With the lower level of light intensity required, one of the eight bulbs (four each in the first and second lines 40 and 42) may burn out without affecting the operation of the circuit 62.

Figure 5:
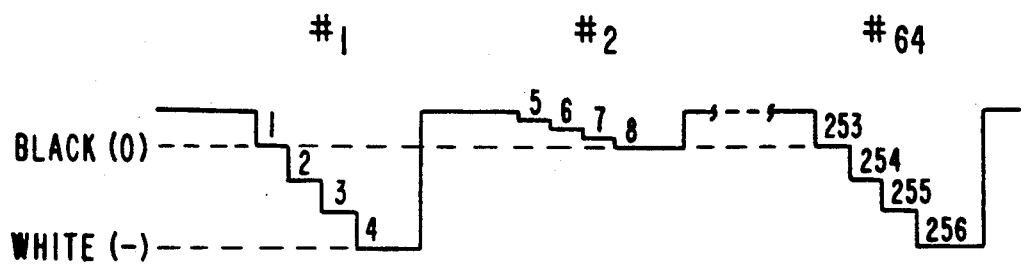
FIG. 5 is a diagrammatic view showing how individual pixels taken along a scanning line are formed into composite pixels.

The video compensation circuit 62 is shown in detail in FIGS. 4A and 4B. The circuit 62 includes standard clock generation circuitry 68 which runs all the time when the reader head 10 is turned on, and this clock circuit 68 is used in conjunction with the light sensing array 52. Adjacent to each pixel sensor 56, there is a shift register element, with these elements being shown collectively as shift registers 70 and 72. Each one of the individual shift register elements mentioned is actually an analog shift register. A good analogy to use is that the electrons coming from the individual sensors 56 are collected in a "well" instead of averaging them. For example, FIG. 5 is a diagramatic showing of the outputs of the 256 pixel sensors 56, which are combined or integrated in a series of "fours" along the scanning line 46. The outputs from pixels 1, 2, 3, and 4 are combined or integrated to produce composite pixel #1. Similarly, the outputs from pixel sensors 5-8 produce composite pixel #2, and the outputs from pixel sensors 253-256 produce composite pixel #64. The analog outputs range from total black which is zero to total white which proceeds downwardly as shown in FIG. 5. The composite black pixel #2 in FIG. 5 is exaggerated in the downward or negative direction simply to facilitate the showing; the white (—) represents a maximum negative direction in the embodiment described. The amplitude of the output of each of the pixel sensors 56 is dependent upon the gray level of that portion of the document 22 being scanned along the scanning line 46. After one scan is completed, the document 22 is moved in the direction of arrow 24 (FIG. 1), and the scanning process is repeated for an adjacent scan line.

Continuing with a description of the circuit 62 shown in FIGS. 4A and 4B, the composite pixels #1-#64 coming from the light sensing array 52 are analog in form, and they are buffered, slightly, in the buffer 74 prior to being forwarded to the analog/digital converter 76. The buffer 74 and the clock generation circuitry 68, for example, may be located on the board 64 (FIG. 2). The converter 76 is a standard item which utilizes two reference points. The first reference point is a white signal which is the most negative as shown in FIG. 5. The second reference point is a black signal which is close to zero. The black signal remains fairly constant; however, the white signal will vary, depending, for example, on the shade or color of the document being scanned.

The A/D converter 76 (FIG. 4A) converts each of the incoming analog composite pixels #1-#64 into a six bit gray level, with a zero being "black" and with 63 being "white". The first or white reference point mentioned in the previous paragraph is obtained by the white peak detector 78, and the second or black reference point is obtained by the black peak detector 80. The side 14-2 of the document track 14 which faces the reader head 10 is painted black or non-reflecting, so when no document 22 is present in the document track, the white peak detector 78 will issue a low or "black" signal level; the same is true for the black peak detector 80. The black enable signal which is fed into the black peak detector 80 comes from the light sensing array 52. Essentially, this black enable signal occurs as a 65th signal and represents the minimal charge or output that the array 52 can have; and consequently, this signal is the minimum black level.

The following situation occurs as a document 22 approaches the reader head 10. A document sensor 82, positioned upstream from the reader head 10, issues a signal when the leading edge of a document 22 approaches it. The signal is issued about five milliseconds before the leading edge of the document actually reaches the reader head 10. As soon as the leading edge of the document 22 is scanned at the scanning line 46, some of the "white" signals coming from the light sensing array 52 will exceed the white condition of the document itself. This is due mainly to the fact that the white signals for the white peak detector 78 were obtained at a time when there was no document at the reader head 10, and consequently, the so-called white reference is actually black. The situation just described will cause the A/D converter 76 to issue an overflow signal, in effect, indicating that the white signals at the scanning line 46 are "whiter" than the white from the white peak detector 78.

The overflow signal which is issued from the A/D converter 76 at the start of a reading cycle as explained in the previous paragraph is used as a safety feature to insure that the circuit 62 does not start taking signals until, in fact, a document 22 is present at the reader head 10. In other words, it is important that the circuit 62 start learning the various video levels at the start of a document 22. If the circuit 62 starts learning before a document is in fact in front of the reader head 10, it will learn the wrong peak levels. If the circuit 62 starts learning too late, it may not have sufficient time to learn the peak levels before the first character to be read arrives at the reader head 10. Continuing with the overflow signal, this signal is fed into a video increase detection circuit 84; this circuit is conventional and it includes a counter (not shown) which counts up to eight before issuing an output therefrom. In circuit 62, eight overflow outputs from the A/D converter 76 are required before an output issues from the video increase detection circuit 84; this insures that the overflow output from the A/D converter 76 is actually due to a document instead of being caused by noise or a glitch, for example. The output of the circuit 84 is fed into a document present circuit 86 which includes an AND gate with some buffering. The output of the document present sensor 82 is fed into the circuit 86, and when the circuit 86 issues an output therefrom, it means that a document is present at the reader head 10. If the document sensor 82 issues a signal, but the video increase detection circuit 84 does not issue a signal, it could mean that there is a torn document or that the document has a dark border; in this situation, the circuit 86 will issue a signal after a time delay equivalent to the time that a document takes to move 3/16 inch. This slight delay will generally enable the circuit 62 to learn the video background prior to actual characters to be read approaching the reader head 10.

Figure 6:
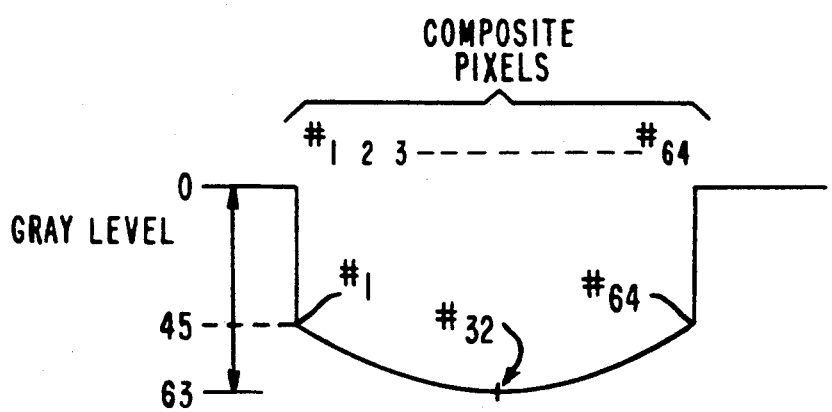
FIG. 6 is a diagrammatic view showing how the gray levels of the composite pixels can vary for a single scan.

Before discussing further the details of the circuit 62, it appears useful to discuss some of the characteristics of the combined pixels #1-#64. In this regard, FIG. 6 shows a diagrammatic view of the combined or composite pixels #1-#64 and their associated gray scale values for a single scan. Even though all these pixels may be related to a scan which is all "white" on the document 22, those pixels which are nearest to the center of the scan would show up as having the whitest gray scale value. In other words, composite pixel #32 shown in FIG. 6 might have a gray scale value of 63, for example, while pixels #1 and #64 might have a gray scale value of 45. This is due mostly to the illumination being generally brighter at the center of the scanning line 46 than it is at the extreme edges. The video compensation performed according to this invention takes this into consideration in that each composite pixel in a scan is compared with the composite pixel in the immediately prior scan for adjusting the associated threshold level, if necessary. In other words, the circuit 62 learns the appropriate white level to use as a threshold from the document as the document is being scanned.

Figure 7:
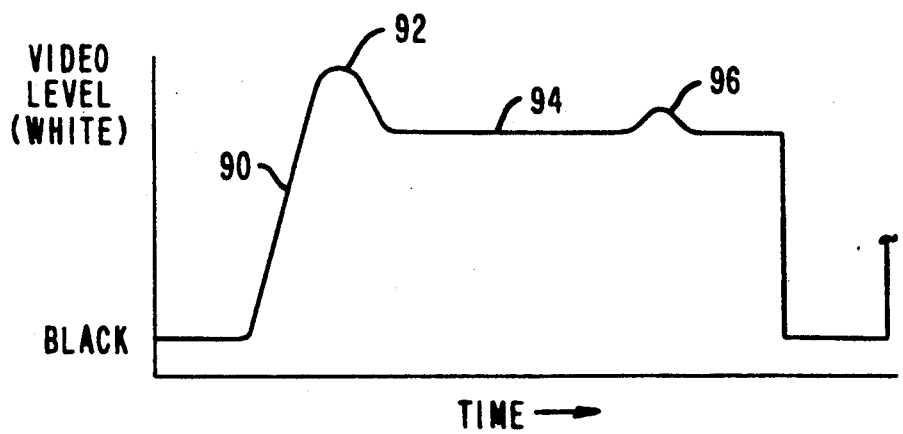
FIG. 7 is a diagram showing certain features of the invention.

FIG. 7 illustrates how the white peak level changes as the scans progress from the leading edge of a document towards the trailing edge of the document 22. The peak comparison PROM 88 (FIG. 4A) has a series of algorithms in it which are used to treat the data coming into it so as to enable it to adjust to quick changes in the video level during start up, for example, and to minimize aberations or glitches after the video peak level has stabilized. The diagram in FIG. 7 is inverted from that shown in FIG. 6 in that the white level increases in a positive direction; this was done only to facilitate the showing of certain peaks associated with the diagram. Notice from FIG. 7 that there is a steep rise in the white level at the start of scanning as shown by area 90 in FIG. 7. The hump 92 indicates increased brightness which may be due to light reflecting from a bent edge of a document. During the time represented by the flat line 94, the peak white value is fairly constant, and it represents a stable or constant lighting condition relative to the document. During this time, the algorithms associated with the peak comparison PROM 88 tend to minimize any sudden increase in brightness. For example, the hump 96 may have been caused by a document reading situation which was just as bright as that which caused the hump 92; however, the effect of the hump 96 is minimized by the algorithms mentioned. How the algorithms function will be discussed later herein.

As alluded to earlier herein, the peak white values from prior scans are stored in the peak storage RAM 98. The document present signal coming from the document present circuit 86 (FIG. 4B) is used to enable the peak storage RAM 98 and the peak comparison PROM 88. When enabled, the RAM 98 will have all zeros in the 64 composite pixel positions for use as the "prior scan pixels" when the first scan from the document is actually received. The peak comparison PROM 88 receives a composite pixel from a current scan (received over the bus marked VIDEO) and also receives a similarly-situated composite peak pixel from the prior scan coming from the RAM 98 via bus 110 and the bus marked PEAK. The peak comparison PROM 88 performs certain comparing and adjustment operations on the inputs received thereat, with these operations to be described hereinafter. The composite peak pixel coming from the RAM 98 (via bus 110 and bus 104) is also fed into the threshold PROM 100 which also receives the composite pixel from the current scan via bus 102. The threshold PROM 100 then compares the current composite pixel (coming in on bus 102) with the adjusted composite pixel (coming in on bus 104) and outputs a 3 bit gray level on bus 106. This output is then forwarded to conventional video enhancement circuitry 107 which is not important to an understanding of this invention.

In the embodiment described, the threshold PROM 100 is designed to output a 3-bit code which compresses the 64 gray levels to eight gray levels ranging from 0-7. For example, a gray level of 63-53 may be considered a "0" in the 3-bit code, a range of 52-47 may be considered a "1", etc., and, finally, a range of 10-0 may be considered a "7". The output signal coming from the threshold PROM 100 on the bus 106 is a signal which is compensated for with regard to noise level, folds, dust, and general light level.

Some additional details relative to different components in the video compensation circuit 62 appear appropriate. In this regard, the clock generation circuitry 68 produces three conventional clock signals for the array 52; they are a transfer clock, a transport clock, and a reset clock. It should be recalled that in the embodiment described, there are four adjacent pixel sensors 56 which are combined to produce one composite pixel. To do the combining, there is an output gate 52-1 (shown only schematically in FIG. 4A) in the array 52 which is utilized for this purpose. The output gate 52-1 is a field effect transistor which functions as a capacitor to add the charges from the individual sensors 56. The function of the transfer clock is to transfer the charge from an individual sensor 56 to its associated analog or transport shift register 70. After the individual charges have been transferred to the associated transport shift registers, they are clocked out of the shift registers 70 to the output gate 52-1 by separate transport clocks. In the embodiment described, four transport clocks are used to accumulate the separate charges on the output gate 52-1 to thereby generate one of the 64 composite pixels used. The composite pixel is then outputted to the buffer 74, as previously described, and the reset signal is used to drain the charge on the output gate 52-1. This process is then repeated for the remaining 63 composite pixels. The clock and generation circuitry 68 also provides the necessary clocking signals for transferring the data around the circuit 62 as described; because the clocking signals are conventional, they are not shown so as to simplify the explanation of the circuit 62.

Some additional details about how the algorithms associated with the peak comparison PROM 88 operate appear beneficial. As previously stated, the video signals (gray levels) entering the PROM 88 come in via a six bit bus 108, and the data coming from the peak storage RAM 98 enters the PROM 88 via an eight bit bus 110. The output from the PROM 88 is fed into the RAM 98 via an eight bit bus 112. In the embodiment described, the output of the PROM 88 consists of five bits for the peak gray scale value, and it also includes a three bit value which will be referred to as a "state" or "mode" value, with the mode values ranging from 0-7. The six bit gray scale value is compressed to five bits (at the output of PROM 88) by dropping the lowest order bit which is in the black range. The mode values mentioned represent different states of operation such as start up lighting conditions and various degrees of stable lighting conditions.

When a scanning operation is begun, the output of the peak storage RAM 98 will contain all zero's which are forwarded to peak comparison PROM 88 over bus 110. The first six bit gray level coming into the PROM 88 on bus 108 is probably different or "whiter" than the zero data from RAM 98. Because the values of the two inputs to the PROM 88 are different or not equal, the three bits which are used to designate the mode output will contain a "0". The remaining portion of the output of the PROM 88 will consist of five bits to designate the incoming gray scale value. The five bits just mentioned and the associated three bits are combined to produce an eight bit byte which is stored in the RAM 98 for that composite pixel. This operation will continue until the stored peak values from successive scans from the RAM 98 equal the video signal from the A/D converter 76. When this occurs, the designation for the mode output from the PROM 88 will be changed to a "1" via the three bit code, and the associated five bit peak value will also be outputted to the RAM 98. Assuming that a stable lighting condition is being encountered at the scanning line 46, a composite pixel value from the next scanning line will equal the value stored for a similarly-situated composite pixel from the immediately prior line of scanning. In this situation, the mode output will be changed to a "2" (indicating the second time the equality was reached) via the three bit code. If again, the incoming video signal on bus 108 equals the value stored for a similarly-situated composite pixel, the mode output will be changed to a "3" for that composite pixel, and the associated peak value for the current composite pixel will be outputted as a five bit value.

When the mode "3" is reached as indicated by the example in the prior paragraph, it means that a steady state has been reached and that a steady peak value has been reached; in other words, the background on the document 22 has reached a steady state as far as illumination, dust, etc. are concerned. The steady peak value which was just reached, will be used as the peak value until such time as the incoming signal deviates from this valid peak value by a predetermined amount. The mode output is used as a means for determining this deviation. For example, assume that after the mode "3" was obtained, the peak value coming into the PROM 88 from the A/D converter 76 increases when compared to the steady peak value stored in the RAM 98. When this increase in value is detected, the PROM 88 will issue a five bit value which is the same as the value received from the RAM 98; however, the mode output will be increased from a "3" to a "4" in the example described. If the incoming value from the A/D converter 76 increases again, the PROM 88 will still use the stored value as its output to the storage RAM 98; however, the mode output will be increased to a "5". In other words, the circuit 62 is minimizing the changes which occur after a steady state has been reached.

If the incoming 6 bit gray level coming from the A/D converter 76 continues to increase when compared to the stable state value obtained from the peak storage RAM 98 via the bus 110 in the example being discussed in the previous paragraph, the peak comparison PROM 88 will issue the same steady state value to the RAM 98; however, the mode output will be increased to a "6". The PROM 88 functions as a look up table when performing the transactions being discussed. As an aside, the steady state value which comes from the RAM 98 is also fed into the threshold PROM 100 which performs the thresholding on the incoming gray level signal from the A/D converter 76 as previously described. If the incoming gray level from the A/D converter 76 again increases, the mode value becomes a "7", and when this occurs, the five bit gray value to be outputted is increased by a predetermined amount, like 1 in the embodiment described, and instead of outputting a mode value of "7", the PROM 88 issues a mode value of "3" again. In other words, the mode values from 4 through 7 reflect consecutive differences detected between a digital peak gray scale value from a current scanning line with the correspondingly-situated digital peak gray scale value withdrawn from the RAM 98. Putting the mode value at a value of "3" starts the process again to enable the circuit 62 to adjust slowly to changes after initial stabilization as discussed in relation to FIG. 7. Now this increased five bit gray level becomes the steady state value as the composite pixel from the immediately prior scan. If the incoming gray level continues to increase, again, the PROM 88 will issue a mode value of "4" to repeat the process of advancing towards the mode value of "7" which represents a change point.

If, for example, there is a large decrease in the incoming value, it is quite likely the the decrease in signal strength represents a black area of the document which area may be a portion of a printed character. No change is made in this situation. If however, the incoming gray level begins to decrease slightly, the mode value will be changed from a "3" to a "4". Correspondingly, if the incoming gray level continues to decrease slightly, the mode value will be increased as described until the value of "7" is reached; thereafter, the mode value which is outputted from the PROM 88 will be a "3", and the associated five bit gray value will be decreased by one to reflect a steady lowering of the value of the composite pixel. From what has been described, the values of the composite pixels from the peak storage RAM 98 as adjusted by the PROM 88 produce the adjusted or compensated composite pixels as described earlier with regard to FIGS. 6 and 7.

Another feature of the circuit 62 (FIGS. 4A and 4B) is that it provides an easy and accurate way of focussing the lens 28 associated with the reader head 10. To facilitate the focussing, a test pattern consisting of alternate black and white lines is placed at the scanning line 46 so that the black lines are horizontal or perpendicular with respect to the scanning line 46. The test pattern is designed so that the spacing and width of the lines insure that there will be a sensing element 56 focussed entirely on a black line while the next adjacent sensing element 56 is focussed entirely on a white line; this sequence is repeated for the entire pattern.

To perform the testing, a separate printed circuit board (PC BOARD) 114, as shown in FIG. 4B, is used. The PC BOARD 114 has its own microprocessor and associated software shown as U.P. 116, and it also includes a plurality of light emitting diodes LED's 118. When the circuit 62 is put into the test mode, the test pattern mentioned is positioned at the scanning line 46 and is held stationary thereat. The data from the 64 composite pixels at the scanning line 46 is taken from the peak storage RAM 98. The peak comparison PROM 88 does nothing at this time other than to pass on the gray scale values to the RAM 98. Through its software, the U.P. 116 will detect which of the composite pixels #1-#64 are the white pixels and which are the black ones, and thereafter, it will calculate the difference between them. The difference between the white pixels and the black ones is then displayed by means of a bar graph, for example, which includes the plurality of LED's 118. As the focussing of the lens 28 is changed, a maximum difference will be obtained when the lens is in focus; at this time, the greatest number of LED's will be energized to give this indication.

In summary, the advantages of this invention are as follows:

1. A very small size is achieved for the reader head 10 through the miniaturized lighting system. Because the bulbs in the lines 40 and 42 are focussed bulbs and are close to the document being read, they use little power and generate little heat.
2. At least one of the focussed bulbs in the reader head 10 may fail without affecting performance of the reader head 10.
3. The focus adjustment for the lens 28 is cam driven, eliminating the need for easily damaged external focussing screw threads.
4. The lens 28 can be removed from the reader head 10 and cleaned without changing the focus adjustment of the lens. At the time that the lens is removed, the light sensing array 52 can also be cleaned without further disassembly of the reader head 10.
5. The document leading and trailing edges are detected in conjunction with the circuit 62; this eliminates adjustments to compensate for variations in distance between the reader head 10 and associated sensors.
6. The video compensation circuit 62 learns the background level of each individual composite pixel at the start of each document. This eliminates adjustments to the lighting system for uneven illumination. The video compensation circuit 62 also compensates for dust build-up as well as bulb failures. Threshold and gain adjustments are also eliminated.
7. Correct focus of the lens 28 is indicated by a plurality of LED's; this eliminates the need for a test "scope" during field maintenance.
8. The reader head 10 requires only two adjustments: namely, the focussing adjustment and the adjustment of the spring or resilient member 48.

What is claimed is:

1. In an optical reader, the combination comprising:
a scanning plane having a scanning line thereat;
transport means for moving documents to be scanned to said scanning line; and
a read heat positioned at said scanning plane to direct light at said scanning line;
said read head comprising:
a body having a front end and a rear end;
a first line and a second line of light bulbs;
a mounting member mounted on said front end of said body for mounting said first and second lines of light bulbs in spaced parallel relationship thereon to enable the light from the light bulbs to be directed at a document positioned at said scanning line and to be reflected from said document between said first and second lines of light bulbs towards the read end of said body;
an array of a predetermined number of light sensors positioned at said rear end of said body, with each said sensor producing a pixel of data corresponding to an area of the document at said scanning line;
a lens and mounting means for adjustably fixing said lens in said body to direct light reflected from said document at said array of light sensors;
a resilient member adjustably secured to said body to maintain a document at said scanning line a predetermined distance from said lens; and
a circuit for combining the pixels of data produced by adjacent ones of said light sensors within each of a plurality of groups into which said light sensors are divided to produce a series of combined pixels therefrom whereby the sensitivity of said array of light sensors is effectively increased to enable said light bulbs to be of a low wattage to avoid head damage to a document which may become jammed at said scanning line;
said circuit further including test means for use in focusing said lens, said test means comprising:
a test pattern consisting of alternate black and white lines positioned at said scanning line in aligned relationship with said sensors so that a sensor is focused entirely on a black line and an adjacent sensor is focused entirely on a white line;
a display; and
circuit means for detecting the difference between the outputs of the combined pixels from said sensors as the focusing of said lens is adjusted so as to provide a maximum signal to said display when said lens is in focus.

2. A video compensation circuit for use with an optical read head, comprising:
a plurality of sensors for producing a series of data pixels in response to light reflected from a scanning line;
means for combining the data pixels produced by adjacent ones of said sensors within each of a plurality of groups into which said sensors are divided so as to produce a series of composite data pixels corresponding to said data pixels from a scanning line;
converting means for converting the composite data pixels into digital peak gray scale values;
storing means for storing the digital peak gray scale values for a scanning line;
comparison means for comparing the digital peak gray scale values for a current scanning line with the digital peak gray scale values stored in said storing means and which correspond to an immediate prior scanning line to detect differences therebetween;
adjusting means for adjusting the peak gray scale values for said current scanning line according to predetermine criteria based upon said detected differences so as to generate adjusted peak gray scale values which are subsequently stored in said storing means; and thresholding means for receiving the digital peak gray scale values for said current scanning line and comparing them with the digital peak gray scale values stored in said storing means to produce outputs in accordance with predetermined thresholding criteria.

3. The circuit as claimed in claim 2 in which said comparison means and said adjusting means are implemented through the use of a PROM.

4. In an imaging system in which a plurality of sensors produce a series of data pixels in response to light reflected from a scanning line of a document, the method of compensating for variations in the background level of said document so as to enhance thresholding of said data pixels, the method comprising the steps of:

(a) converting each data pixel into a digital peak gray scale value;

(b) storing the digital peak gray scale values for a scanning line in a RAM;

(c) comparing a digital peak gray scale value from a current scanning line with a corresponding digital peak gray scale value read from said RAM in a thresholding operation to produce a thresholded output;

(d) also comparing the digital peak gray scale value from said current scanning line with the corresponding digital peak gray scale value read from said RAM to detect a difference therebetween;

(e) adjusting the digital peak gray scale value read from said RAM in step d, if necessary, according to predetermined criteria based upon the detected difference of step d;

(f) storing the digital peak gray scale value after adjustment, if any, from step e in said RAM whereby the digital peak gray scale value from step e are used in said comparing steps c and d for the digital peak gray scale values associated with an immediately subsequent scanning line.

5. In an imaging system in which a plurality of sensors produce a series of data pixels in response to light reflected from a scanning line of a document, the method of compensating for variations in the background level of said document so as to enhance thresholding of said data pixels, the method comprising the steps of:

(a) combining the pixels of data produced by adjacent ones of said light sensors within each of a plurality of groups into which said light sensors are divided so as to produce a series of composite pixels from said scanning line;

(b) converting each composite pixel into a digital peak gray scale value;

(c) storing the digital peak gray scale values for a scanning line in a RAM;

(d) comparing a digital peak gray scale value from a current scanning line with a corresponding digital peak gray scale value read from said RAM in a thresholding operation to produce a thresholded output for the associated composite pixel;

(e) also comparing the digital peak gray scale value from said current scanning line with the corresponding digital peak gray scale value read from said RAM to detect a different therebetween;

(f) adjusting the digital peak gray scale value read from said RAM in step e, if necessary, according to predetermined criteria based upon the detected difference of step e; and (g) storing the digital peak gray scale value after adjustment, if any, from step f in said RAM whereby the digital peak gray scale value from step f is used for said comparing steps d and e for a corresponding digital peak gray scale value associated with an immediately subsequent scanning line.

6. The method as claimed in claim 5 in which said adjusting step f also includes the step of adjusting, if necessary, a mode value ranging from 0 to 7 according to said predetermined criteria, with a mode value of 0 representing a start up condition and a mode value of 3 representing a steady state condition in which the digital peak gray scale value from the current scanning line has been equal to the corresponding digital peak gray scale value read from said RAM for a predetermined number of times.

7. The method as claimed in claim 6 in which said storing step g also includes the step of storing in said RAM said mode value along with the associated digital peak gray scale value.

8. The method as claimed in claim 7 in which said adjusting step f also includes the step of adjusting, if necessary, the digital peak gray scale value by a predetermined amount when the associated mode value reaches 7, with mode values of 4 through 7 denoting that a difference has been detected between said digital peak gray scale value from said curr

* * * * *

UNITED STATES PATENT AND TRADEMARK OFFICE
CERTIFICATE OF CORRECTION

PATENT NO. : 5,115,325
DATED : May 19, 1992
INVENTOR(S) : Kallin et al.

It is certified that error appears in the above-identified patent and that said Letters Patent is hereby corrected as shown below:

Column 12, line 1, "heat" should be --head--.

Column 13, line 1, "predetermine" should be --predetermined--.

Column 14, line 49, after "curr" add --ent scanning line and the digital peak gray scale value read from said RAM at step e.

Signed and Sealed this

Fourteenth Day of September, 1993

Attest:

BRUCE LEHMAN

Attesting Officer

Commissioner of Patents and Trademarks